(12) United States Patent
Ribarov et al.

(10) Patent No.: US 10,422,586 B2
(45) Date of Patent: Sep. 24, 2019

(54) HEAT EXCHANGER

(71) Applicant: Hamilton Sundstrand Corporation, Charlotte, NC (US)

(72) Inventors: Lubomir A. Ribarov, West Hartford, CT (US); Leo J. Veilleux, Jr., Wethersfield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 661 days.

(21) Appl. No.: 14/937,259

(22) Filed: Nov. 10, 2015

(65) Prior Publication Data
US 2017/0131034 A1    May 11, 2017

(51) Int. Cl.
*F28D 7/00* (2006.01)
*F28F 9/02* (2006.01)
(Continued)

(52) U.S. Cl.
CPC .......... *F28D 7/0066* (2013.01); *B22F 3/1055* (2013.01); *B22F 5/10* (2013.01);
(Continued)

(58) Field of Classification Search
CPC ............. F28D 1/0233; F28D 2001/026; F28D 1/0408; F28D 2021/0021; F28D 1/0426;
(Continued)

(56) References Cited

U.S. PATENT DOCUMENTS 1,524,520 A * 1/1925 Junkers ..................... F28F 1/24
126/118
1,787,118 A * 12/1930 Murray ............... F28D 1/05333
165/144
(Continued)

FOREIGN PATENT DOCUMENTS

FR     2930982 A1   11/2009
GB     2032611 A    5/1980
(Continued)

OTHER PUBLICATIONS

WO2015121091A1—English Machine Translation.*
Search Report regarding related GB App. No. 1618843.5; dated May 8, 2017; 4 pgs.

*Primary Examiner* — Jianying C Atkisson
*Assistant Examiner* — Jose O Class-Quinones
(74) *Attorney, Agent, or Firm* — Cantor Colburn LLP

(57) ABSTRACT

A heat exchanger is disclosed including an array of interlaced conduits. The conduit array includes a first plurality of conduits connected to a first inlet header at one end of the first plurality of conduits and to a first outlet header at an opposite end of the first plurality of conduits. This first plurality of conduits provides a first fluid flow path from the first inlet header through the first plurality of conduits to the first outlet header. The conduit array also includes a second plurality of conduits crossing and interlaced with the first plurality of conduits. First and second fluid flow paths are provided through the first and second pluralities of conduits, and a third fluid flow path is through open spaces between the crossed interlaced first and second pluralities of conduits.

14 Claims, 3 Drawing Sheets

(51) Int. Cl.
*B23P 15/26* (2006.01)
*B22F 3/105* (2006.01)
*B22F 5/10* (2006.01)
*B33Y 10/00* (2015.01)
*F28D 21/00* (2006.01)

(52) U.S. Cl.
CPC ............... *B23P 15/26* (2013.01); *B33Y 10/00* (2014.12); *F28D 7/0083* (2013.01); *F28F 9/02* (2013.01); *F28D 2021/0021* (2013.01); *Y02P 10/295* (2015.11)

(58) Field of Classification Search
CPC .... F28D 1/0435; F28D 1/0452; F28D 7/0016; F28D 7/0058; F28D 7/0083; F28D 7/0066; F28D 9/0093; F28D 7/0008; F28D 7/0025; F28D 7/0033; F28D 7/0041; F28F 2210/04; F28F 2225/04; F28F 9/02
See application file for complete search history.

(56) References Cited

U.S. PATENT DOCUMENTS

| | | | | |
|---|---|---|---|---|
| 2,006,649 A * | 7/1935 | Modine | ................ | F28D 1/0535 165/146 |
| 3,073,575 A * | 1/1963 | Schulenberg | ............. | F28B 1/06 165/146 |
| 3,223,152 A * | 12/1965 | Schulenberg | ............. | F28B 1/06 165/124 |
| 3,601,115 A | 8/1971 | Weatherston | | |
| 3,961,665 A * | 6/1976 | Langbroek | ............... | B01D 7/02 165/111 |
| 3,977,206 A * | 8/1976 | Simmons | ................ | F28D 15/06 165/44 |
| 4,208,220 A * | 6/1980 | White | ..................... | B08B 9/023 134/10 |
| 4,315,300 A * | 2/1982 | Parmerlee | .......... | H05K 7/20636 165/80.4 |
| 4,434,624 A * | 3/1984 | Cronin | ................... | B64D 13/06 62/172 |
| 4,449,575 A * | 5/1984 | Laws | ..................... | F28D 13/00 165/158 |
| 4,505,124 A * | 3/1985 | Mayer | .................... | B64D 37/34 123/553 |
| 5,157,941 A * | 10/1992 | Cur | ........................ | F25B 39/02 165/146 |
| 5,964,284 A | 10/1999 | Ikejima et al. | | |
| 6,205,803 B1 * | 3/2001 | Scaringe | .................. | F25B 5/02 165/104.33 |
| 6,883,597 B2 | 4/2005 | Thors et al. | | |
| 7,073,347 B2 * | 7/2006 | Hermes | .................. | F25B 39/02 62/515 |
| 8,247,333 B2 * | 8/2012 | Sypeck | ..................... | B32B 5/26 156/60 |
| 2005/0006066 A1 * | 1/2005 | Emrich | ................. | F02B 29/045 165/133 |
| 2008/0190403 A1 * | 8/2008 | Grunenwald | ........... | C23F 13/14 123/568.12 |
| 2010/0263847 A1 | 10/2010 | Alahyari et al. | | |
| 2011/0056667 A1 | 3/2011 | Taras et al. | | |
| 2014/0251585 A1 * | 9/2014 | Kusuda | .................... | F28D 1/06 165/164 |
| 2015/0218951 A1 | 8/2015 | Weaver | | |
| 2015/0267966 A1 * | 9/2015 | Lin | ....................... | F28D 7/0016 165/164 |

FOREIGN PATENT DOCUMENTS

| | | | | |
|---|---|---|---|---|
| JP | 2000146461 A | 5/2000 | | |
| JP | 2003130565 A | 5/2003 | | |
| JP | 2006112734 A | 4/2006 | | |
| WO | WO 2015121091 A1 * | 8/2015 | .......... | F02B 29/0462 |

* cited by examiner

HEAT EXCHANGER

BACKGROUND

This disclosure relates to heat exchangers, and in particular to a heat exchanger having an interlace structure.

Heat exchangers are devices built for transferring heat from one fluid to another. Heat is typically transferred without mixing of the fluids, which can be separated by a solid wall or other divider. Heat exchangers can be used in various applications, including but not limited to aerospace, refrigeration, air conditioning, space heating, electricity generation, and chemical processing applications.

Heat exchangers are often subject to physically-induced stress from external forces. For example, in many applications such as transportation (e.g., aerospace, automotive) or industrial applications, a heat exchanger can be subject to stress from vibration, g-forces, or impact. Additionally, heat exchangers can be subject to thermal stress. A fluid on a heat rejection side of a heat exchanger typically undergoes a drop in temperature between the heat rejection side inlet and the heat rejection side outlet. Similarly, a fluid on a heat absorption side of a heat exchanger typically undergoes an increase in temperature between the heat absorption side inlet and the heat absorption side outlet. Such temperature variations can subject heat exchanger components to thermally-induced stress. For example, in aviation applications, it is often necessary to reduce the temperature of compressor section bleed air from gas turbine engines to use as a coolant to remove heat from engine structures such as main shaft/spool bearings or to use as an air source for environmental control systems (ECS). Bleed air from a gas turbine engine such as on an aircraft is at a high temperature, often in excess of 1000° F. (538° C.), while external ambient air (e.g., ram air) at elevated flight altitude can be below 0° F. (−18° C.). Such temperature differences can subject the heat exchanger to undesirable levels of thermal stress. Physical or thermal stresses can be managed by incorporating robust structures in the heat exchanger itself or in external mounting components that are resistant to or tolerant of stress, or that can transfer stress to non-critical stress-absorbing structures. However, such structures add complexity and expense to product designs, as well as requiring extra weight that is not desirable in weight-sensitive and space-limited applications such as aerospace or automotive applications.

BRIEF DESCRIPTION

In some aspects of this disclosure, a heat exchanger is disclosed comprising an array of conduits (a "conduit array"). The conduit array comprises a first plurality of conduits connected to a first inlet header at one end of the first plurality of conduits and to a first outlet header at an opposite end of the first plurality of conduits. This first plurality of conduits provides a first fluid flow path from the first inlet header through the first plurality of conduits to the first outlet header. The conduit array also includes a second plurality of conduits crossing and interlaced with the first plurality of conduits. The second plurality of conduits are connected to a second inlet header at one end of the second plurality of conduits and to a second outlet header at an opposite end of the second plurality of conduits. The second plurality of conduits provides a second fluid flow path from the second inlet header through the second plurality of conduits to the second outlet header. The heat exchanger also includes a third fluid flow path through open spaces between the crossed interlaced first and second pluralities of conduits.

In some aspects of this disclosure, a heat transfer system comprises the above-described heat exchanger, a heat source in thermal communication with the first and second fluid flow paths, and a heat sink in thermal communication with the third fluid flow path.

In some aspects of this disclosure, a heat transfer system comprises the above-described heat exchanger, a first heat source in thermal communication with the first fluid flow paths, and a heat sink in thermal communication with the third fluid flow path.

In some aspects of this disclosure, a heat transfer system comprises the above-described heat exchanger, a heat sink in thermal communication with the first and second fluid flow paths or a first heat sink in thermal communication with the first fluid flow path and a second heat sink in thermal communication with the second fluid flow path, and a heat source in thermal communication with the third fluid flow path.

In some aspects of this disclosure, a method of making a heat exchanger comprises generating a digital model of a heat exchanger. The heat exchanger comprises array of conduits (a "conduit array"). The conduit array comprises a first plurality of conduits connected to a first inlet header at one end of the first plurality of conduits and to a first outlet header at an opposite end of the first plurality of conduits. This first plurality of conduits provides a first fluid flow path from the first inlet header through the first plurality of conduits to the first outlet header. The conduit array also includes a second plurality of conduits crossing and interlaced with the first plurality of conduits. The second plurality of conduits are connected to a second inlet header at one end of the second plurality of conduits and to a second outlet header at an opposite end of the second plurality of conduits. The second plurality of conduits provides a second fluid flow path from the second inlet header through the second plurality of conduits to the second outlet header. The heat exchanger also includes a third fluid flow path through open spaces between the crossed interlaced first and second pluralities of conduits. According to this method, the digital model is inputted into an additive manufacturing apparatus or system comprising an energy source, and formed by repeatedly applying energy from the energy source to fuse successively applied incremental quantities of a fusible material corresponding to the digital model of the heat exchanger.

BRIEF DESCRIPTION OF THE DRAWINGS

The subject matter of the disclosure is particularly pointed out and distinctly claimed in the claims at the conclusion of the specification. The foregoing and other features, and advantages of the present disclosure are apparent from the following detailed description taken in conjunction with the accompanying drawings where like numbering is used in the different figures to describe like components, and in which:

DETAILED DESCRIPTION

Figure 1:
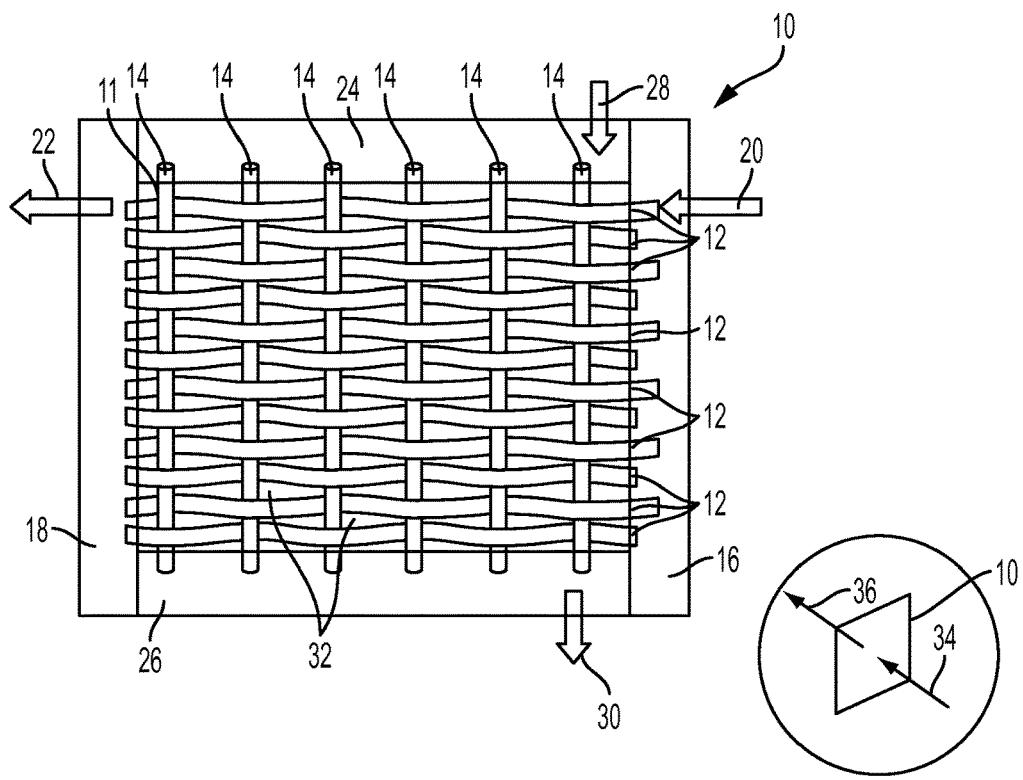
FIG. 1 is a schematic depiction of an example of heat exchanger.

Referring now to the Figures, an example of a heat exchanger 10 is shown in FIG. 1. As shown in FIG. 1, heat exchanger 10 includes a conduit array 11 that comprises a first plurality of conduits 12, shown in FIG. 1 extending horizontally. The heat exchanger 10 also includes a second plurality of conduits 14, shown in FIG. 1 extending vertically. The first plurality of conduits 12 are connected to a first inlet header 16 and a first outlet header 18, and these conduits along with the inlet and outlet headers provide a first fluid flow path depicted by a first inlet fluid flow represented by arrow 20 and a first outlet fluid flow represented by arrow 22. Similarly, the second plurality of conduits 14 are connected to a second inlet header 24 and a second outlet header 26, and these conduits along with the inlet and outlet headers provide a second fluid flow path depicted by a second inlet fluid flow represented by arrow 28 and a second outlet fluid flow represented by arrow 30. A third fluid flow path is provided through open spaces 32 between the first plurality of conduits 12 and the second plurality of conduits 14. The third fluid flow path is depicted by a third inlet fluid flow represented arrow 34 and a third outlet fluid flow represented by arrow 36. The heat exchanger 10 will typically be disposed as a core inside a housing or shell (not shown) that would provide an enclosure within which fluid would flow along the third fluid flow path.

As mentioned above, the first plurality of conduits 12 and second plurality of conduits 14 are crossing and interlaced (i.e., interwoven) with one another. As used herein, the term interlaced or interwoven means that at least one conduit from the first plurality of conduits crosses two or more conduits from the second plurality on opposing sides thereof and that at least one conduit from the second plurality of conduits crosses two or more conduits from the first plurality on opposing sides thereof. In some aspects, all of the conduits from the first plurality of conduits cross two or more conduits from the second plurality on opposing sides thereof and all of the conduits from the second plurality of conduits cross two or more conduits from the first plurality on opposing sides thereof. In some aspects, and as depicted in FIG. 1, the conduits cross each other on alternating sides, producing an alternating over and under crossing interlace configuration, sometimes referred to as a "basket weave" pattern. The first plurality of conduits 12 and the second plurality of conduits 14 are shown in FIG. 1 as extending in directions at right angles to one another, with the first plurality of conduits 12 extending horizontally and the second plurality of conduits 14 extending vertically, as depicted in FIG. 1. However, other angles between 0° and 90° can be utilized as well, depending on the desired size and configuration of the conduit array and the interlace pattern.

The interlaced or interwoven first and second pluralities of conduits can be on a common plane in order to facilitate the interlaced pattern. The term "plane", as used herein, is not limited to the theoretical geometric definition, which is limited to two dimensions. Since the conduits themselves are three-dimensional, they of course cannot exist in a theoretical two-dimensional space. Instead, the term "common plane" means a substantially two-dimensional space that extends along the length of the both the first and second pluralities of conduits, with a third dimension sufficiently large to provide for the diameter of the conduits plus additional space in the third dimension to accommodate the deviation in that dimension for the conduits to cross one another in an interlaced crossing pattern. Additionally, although the common plane is depicted in FIG. 1 as a flat plane, the common plane can be curved such as a single continuous curve or a series of curves (e.g., a series of waves). The third fluid flow path as shown by arrows 34, 36 in FIG. 1 is depicted as extending in a direction normal to the common plane of the first and second pluralities of conduits. However, other angles can be utilized as well, and can be configured by means such as baffles, shape or configuration of a housing within which the heat exchanger core is disposed, or location of inlet and outlet ports for the third fluid flow path.

A crossing interlace configuration of conduits can provide a robust structure. In some aspects, the conduits of the first plurality of conduits 12 can be linked to the second plurality of conduits at contact points where the conduits cross one another. In some examples of embodiments, the conduits can be linked by a simple interference or friction fit. In some examples of embodiments, the conduits can be bonded with an adhesive, or brazing or welding. In some examples of embodiments, the conduits can be fused together without the use of a bonding agent, for example by fabricating with an additive manufacturing process to be joined together at the crossing points. The integrity of the heat exchanger structure can be further enhanced, for example, by binding the headers together such as with carbon fibers or other high-strength fibers.

Figure 2:
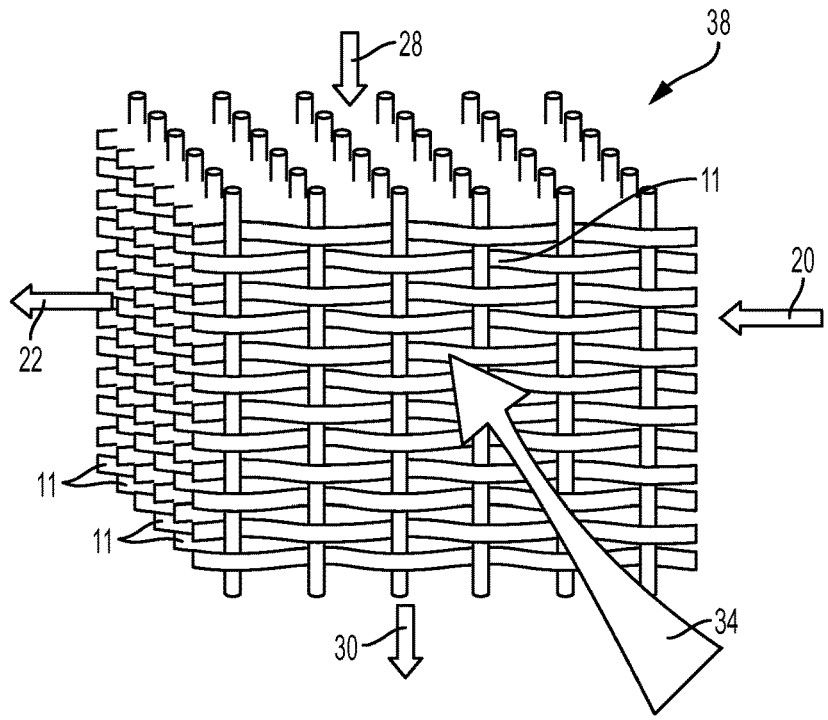
FIG. 2 is a schematic depiction of another example of a heat exchanger.
Figure 3A:
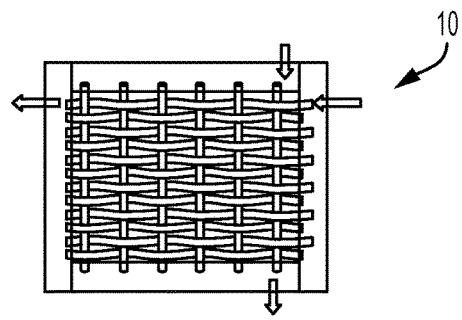
FIGS. 3A and 3B are schematic depictions of conduit arrays having different interlace densities.
Figure 3B:
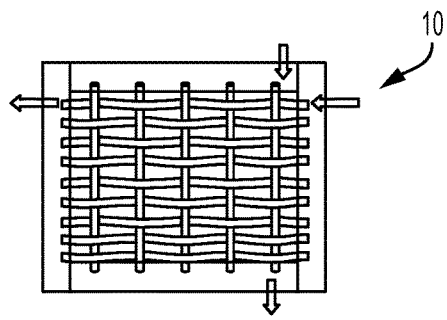

In some aspects, a plurality of conduit arrays 11 can be arranged in a stacked configuration 38 as shown in FIG. 2 to form heat exchangers of varying sizes and configurations. The alignment of the stacked arrays can be configured so that the open spaces 32 in the plurality of conduit arrays 11 are aligned with one another, or can be staggered either vertically, horizontally, or both vertically and horizontally (e.g., by half a row up/down or left/right to facilitate mixing of fluid flow 34 as it flows through the array field. Planes of a curved wave pattern as described above can also be utilized to facilitate fluid flow mixing. The stacked arrays can be identical to one another, or one or more of the arrays can be different from one or more other arrays in the stacked configuration 38. Differences between arrays can manifest as different conduit sizes or shapes, different spacing, or different numbers of conduits, all of which are referred to herein as differences in interlace density. An example of different interlace densities resulting from a different number of conduits is schematically depicted in FIGS. 3A and 3B, with FIG. 3A depicting an interlace density similar to that of FIG. 1 and FIG. 3B depicting a lower interlace density (i.e., looser weave pattern). Such variations in interlace density can be utilized, for example, to mitigate the effects of ice buildup. For example, if the heat exchanger is deployed in an aviation environment where ambient low-temperature external air flows along the third fluid flow path, ice can form along the exterior of the heat exchanger conduits, and a lower interlace density can be utilized toward the third fluid flow path inlet to mitigate the undesirable effects of frost/ice formation such as frost/ice clogging, while a higher interlace density can be used toward the third fluid flow path outlet to achieve greater heat transfer efficiency or capacity. This in turn allows for more rapid melting of any accumulated ice/frost, or alternatively, altogether prevents the undesirable formation of frost/ice along the exterior of the heat exchanger conduits.

The heat exchangers described herein can be used in a variety of configurations for a variety of applications. For example, in some aspects, a heat rejection side of the heat exchanger comprises the first and second fluid flow paths, and a heat absorption side of the heat exchanger comprises the third fluid flow path, and can be utilized in a heat transfer system with one or more heat sources or heat loads in fluid communication with the first and second flow paths and a heat sink in fluid communication with the third fluid flow path. In some aspects, a heat absorption side of the heat exchanger comprises the first and second fluid flow paths, and a heat rejection side of the heat exchanger comprises the third fluid flow path, and can be utilized in a heat transfer system with one or more heat sinks in fluid communication with the first and second flow paths and a heat source or heat load in fluid communication with the third fluid flow path. Additionally, the presence of first and second fluid flow paths on one thermal side (heat rejection or heat absorption) of the heat exchanger can allow for connection to a single heat source (or heat sink depending on system configuration) or to multiple heat sources or heat sinks. This can provide system design and operational flexibility. For example, heat-generating redundant aviation systems (e.g., redundant avionics bays) can be accommodated by thermally connecting one of the redundant systems to the first fluid flow path and the other of the redundant systems to the second fluid flow path. Some examples of heat transfer systems are described below with regard to FIGS. 4 and 5.

Figure 4:
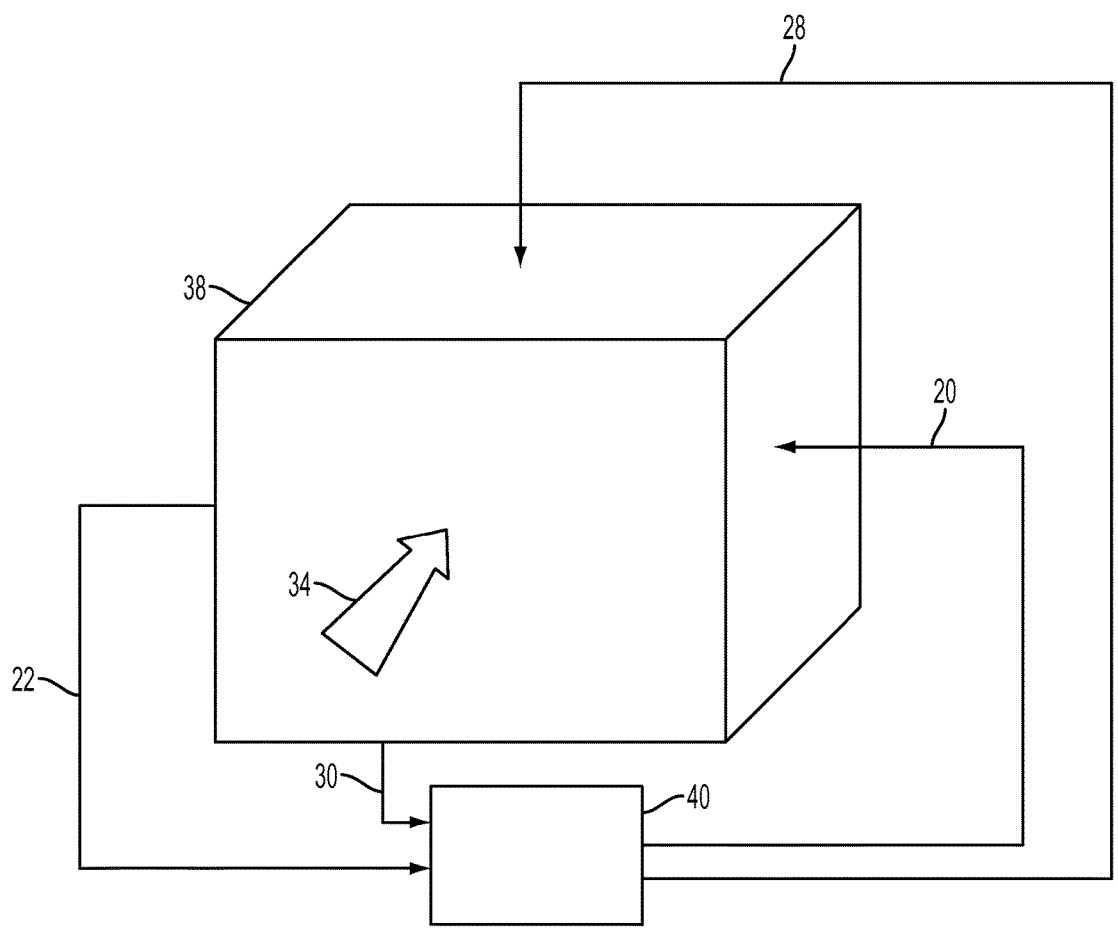
FIG. 4 is a schematic depiction of a heat transfer system.
Figure 5:
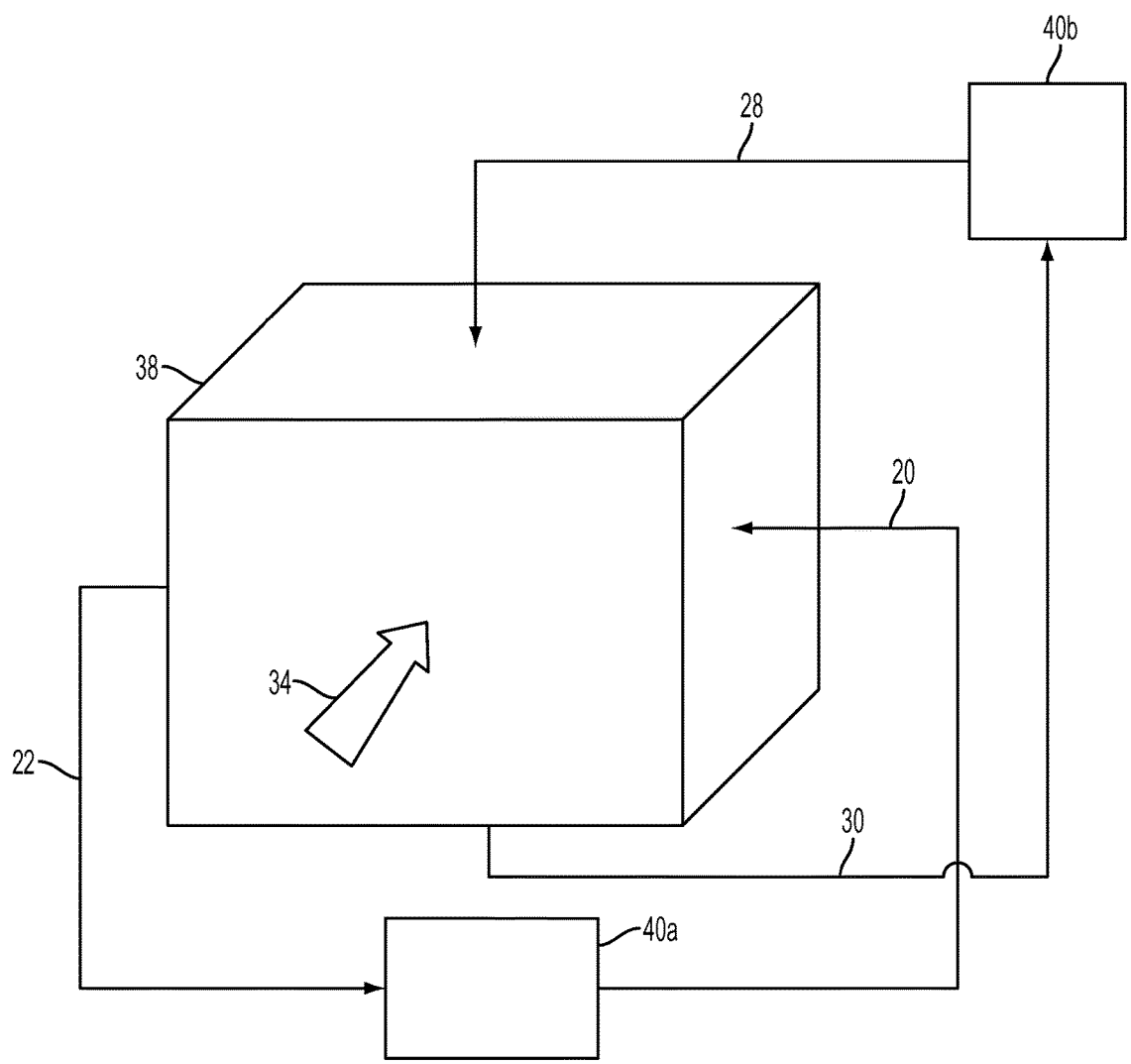
FIG. 5 is a schematic depiction of a heat transfer system.

FIG. 4 depicts a heat transfer system where a heat exchanger stack configuration 38 has its first and second fluid flow paths in fluid communication with a single heat source or heat sink 40 along fluid flow paths 20, 22 and 28, 30 respectively. FIG. 5 depicts a heat transfer system where a heat exchanger stack configuration 38 has its first fluid flow path in fluid communication with a first heat source or heat sink 40a along fluid flow paths 20, 22, and has its second fluid flow path in fluid communication with a second heat source or heat sink 40b along fluid flow paths 28, 30. In some examples of embodiments as shown in FIG. 4 and FIG. 5, 40, 40a, or 40b can represent an avionics bay or system or redundant avionics bays or systems on an aircraft, and the third fluid flow path 34 is outside ambient (ram) air. In some examples of embodiments, 40, 40a, or 40b can represent a hot air bleed from a compressor section of a gas turbine engine such as the main propulsion plant on an aircraft, and the third fluid flow path 34 is outside ambient air (e.g., ram air or bypass airflow from the gas turbine engine). Alternatively, the hot air bleed can come from a compressor section of a gas turbine engine such as the auxiliary power unit (APU) on an aircraft. In another alternative, the hot air stream can come from an electrically (or otherwise) powered fan drawing hot air from another heat source on-board an aircraft. In addition to air-air heat transfer systems, the heat exchangers described herein can be used for any other type of fluid-fluid heat exchange. For example, the fluids along the first, second, and third flow paths can be any combination of liquids, air (or other gases), or two-phase gas-liquid compositions. In some embodiments for example, the fluid along the first and second flow paths 20, 22 and 28, 30, respectively, can be fuel or oil that is cooled by air on flow paths 34, 36. In other examples of embodiments, the fluid along the first and second flow paths 20, 22 and 28, 30, respectively, can be a liquid phase, vapor phase, or two-phase gas-liquid refrigerant composition (comprising, for example, an organic refrigerant chemical compound) that is cooled by air on flow paths 34, 36.

The interlaced heat exchanger structures described herein can be manufactured by conventional techniques such as metal-forming techniques to bend conduits into the proper configuration to accommodate the interlaced structure, brazing, etc. Of course, the materials are not limited to metals and for some applications, polymer heat exchangers can also be utilized. In some aspects of this disclosure, additive manufacturing is used to fabricate any part of or all of the heat exchanger structures. Additive manufacturing techniques can be used to produce a wide variety of structures that are not readily producible by conventional manufacturing techniques.

The digital models used in the practice of the invention are well-known in the art, and do not require further detailed description here. The digital model can be generated from various types of computer aided design (CAD) software, and various formats are known, including but not limited to SLT (standard tessellation language) files, AMF (additive manufacturing format) files, PLY files, wavefront (.obj) files, and others that can be open source or proprietary file formats.

Various types of additive manufacturing materials, energy sources, and processes can be used to fabricate the heat exchanger or the individual features thereof that are described herein. The type of additive manufacturing process used depends in part on the type of material out of which it is desired to manufacture the heat exchanger. In some embodiments, the heat exchanger is made of metal, and a metal-forming additive manufacturing process can be used. Such processes can include selective laser sintering (SLS) or direct metal laser sintering (DMLS), in which a layer of metal or metal alloy powder is applied to the workpiece being fabricated and selectively sintered according to the digital model with heat energy from a directed laser beam. Another type of metal-forming process includes selective laser melting (SLM) or electron beam melting (EBM), in which heat energy provided by a directed laser or electron beam is used to selectively melt (instead of sinter) the metal powder so that it fuses as it cools and solidifies. Various metals and metal alloys can be used, including but not limited to cobalt-chromium (CoCr) alloys, stainless steels, nickel base alloys, aluminum and titanium alloys. In some embodiments, the heat exchanger is made of a polymer, and a polymer or plastic forming additive manufacturing process can be used. Such process can include stereolithography (SLA), in which fabrication occurs with the workpiece disposed in a liquid photopolymerizable composition, with a surface of the workpiece slightly below the surface. Light from a laser or other light beam is used to selectively photopolymerize a layer onto the workpiece, following which it is lowered further into the liquid composition by an amount corresponding to a layer thickness and the next layer is formed. Polymer housings can also be fabricated using selective heat sintering (SHS), which works analogously for thermoplastic powders to SLS for metal powders. Another exemplary additive manufacturing process that can be used for polymers or metals is fused deposition modeling (FDM), in which a metal or thermoplastic feed material (e.g., in the form of a wire or filament) is heated and selectively dispensed onto the workpiece through an extrusion nozzle.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A heat exchanger comprising a conduit array that comprises
   a first plurality of conduits connected to a first inlet header at one end of the first plurality of conduits and to a first outlet header at an opposite end of the first plurality of conduits, providing a first fluid flow path from the first inlet header through the first plurality of conduits to the first outlet header;
   a second plurality of conduits crossing and interlaced with the first plurality of conduits, the second plurality of conduits connected to a second inlet header at one end of the second plurality of conduits and to a second outlet header at an opposite end of the second plurality of conduits, providing a second fluid flow path from the second inlet header through the second plurality of conduits to the second outlet header; and
   a third fluid flow path through open spaces between the crossed interlaced first and second pluralities of conduits,
   wherein the heat exchanger comprises a plurality of said conduit arrays disposed along the third fluid flow path, and at least two of the plurality of conduit arrays disposed along the third fluid flow path have different interlace densities.

2. The heat exchanger of claim 1, wherein a first conduit array disposed upstream along the third fluid with respect to a second conduit array has a lower interlace density than the second conduit array interlace density.

3. The heat exchanger of claim 1, wherein the second plurality of conduits is disposed along a common plane with the first plurality of conduits, and the third fluid flow path is normal to the common plane.

4. A heat transfer system comprising the heat exchanger of claim 1, a heat source in thermal communication with the first and second fluid flow paths or a first heat source in thermal communication with the first fluid flow path and a second heat source in thermal communication with the second fluid flow path, and a heat sink in thermal communication with the third fluid flow path.

5. The heat transfer system of claim 4, wherein the first, second, and third fluid flow paths comprise air.

6. The heat transfer system of claim 4, wherein the first and second fluid flow paths comprise a liquid and the third fluid flow path comprises air.

7. The heat transfer system of claim 4, wherein the first and second fluid flow paths comprise a two-phase gas-liquid composition and the third fluid flow path comprises air.

8. The heat transfer system of claim 4, wherein the heat source comprises an aircraft component or system or the first and second heat sources comprise aircraft components or systems, and the heat sink comprises ambient air external to the aircraft.

9. The heat transfer system of claim 8, wherein the heat source or the first and second heat sources are selected from avionic systems, compressor bleed from a gas turbine engine, fuel, or oil.

10. The heat transfer system of claim 8, wherein the conduit array further comprises a first conduit array and a second conduit array, wherein the first conduit array is disposed upstream along the third fluid with respect to the second conduit array, and the first conduit array has a lower interlace density than the second conduit array interlace density.

11. The heat transfer system of claim 4, comprising the first heat source in thermal communication with the first fluid flow path and the second heat source in thermal communication with the second fluid flow path.

12. The heat transfer system of claim 11, wherein the first and second heat sources comprise aircraft components or systems that are redundant to each other and the heat sink comprises ambient air external to the aircraft.

13. The heat transfer system of claim 12, wherein the first and second heat sources are redundant avionics systems.

14. A heat transfer system comprising the heat exchanger of claim 1, a heat sink in thermal communication with the first and second fluid flow paths or a first heat sink in thermal communication with the first fluid flow path and a second heat sink in thermal communication with the second fluid flow path, and a heat source in thermal communication with the third fluid flow path.

* * * * *